W. H. RONEY.
VALVE FOR GRANULAR MATERIALS.
APPLICATION FILED SEPT. 24, 1913.
1,116,741.
Patented Nov. 10, 1914.
3 SHEETS—SHEET 1.
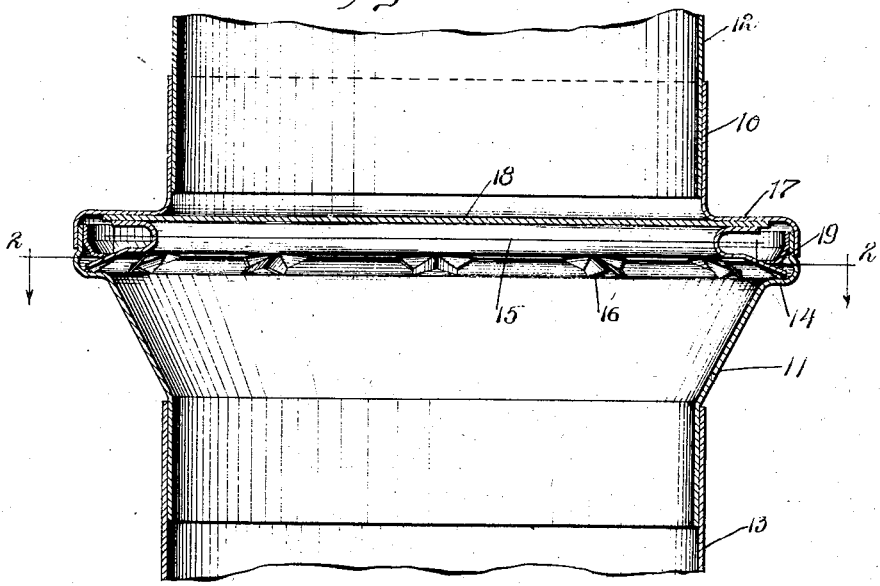
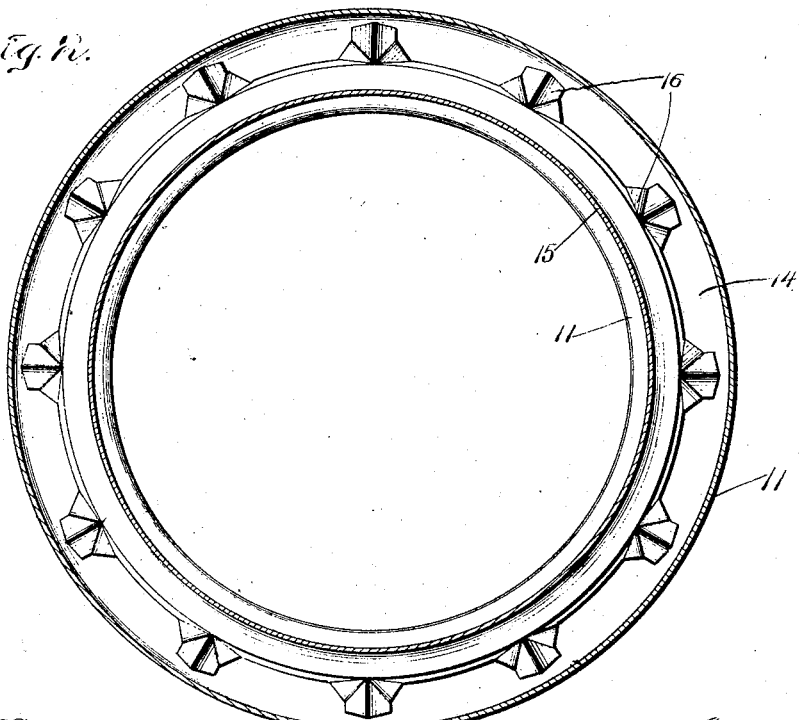
Witnesses:
Inventor,
William H. Roney
by Luther L. Miller
Attorney.

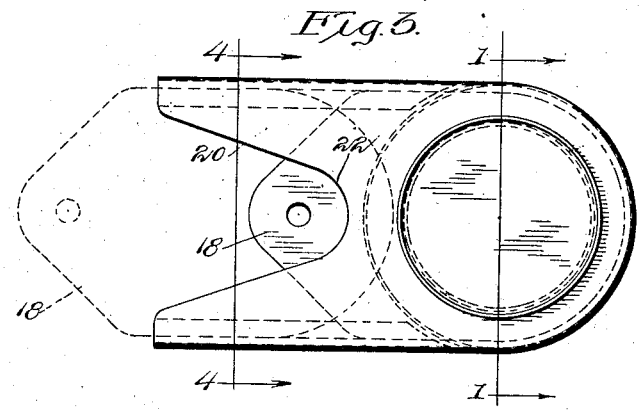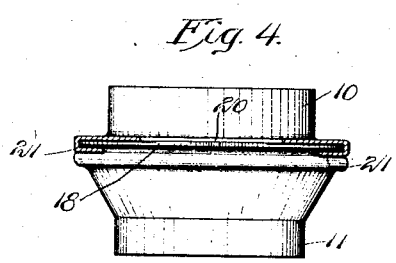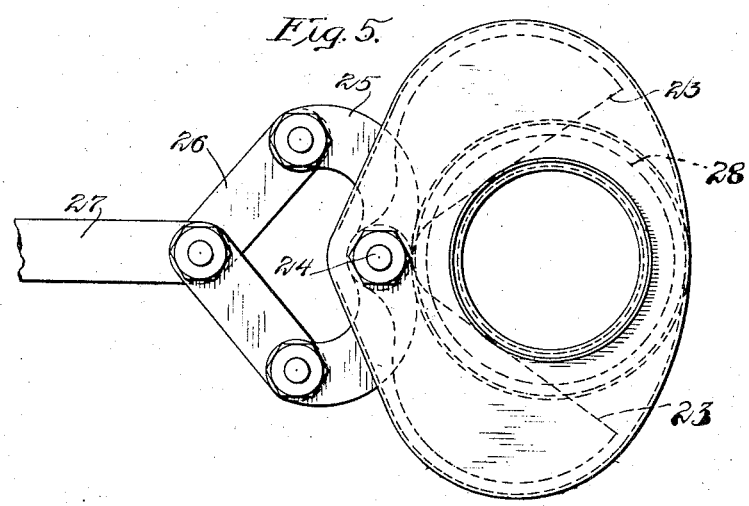

W. H. RONEY.
VALVE FOR GRANULAR MATERIALS.
APPLICATION FILED SEPT. 24, 1913.
1,116,741.
Patented Nov. 10, 1914.
3 SHEETS—SHEET 3.
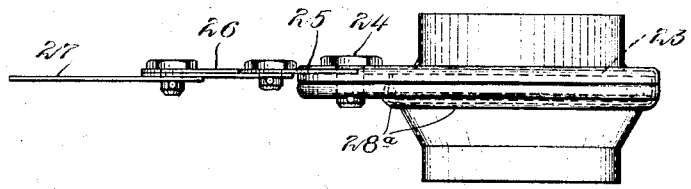
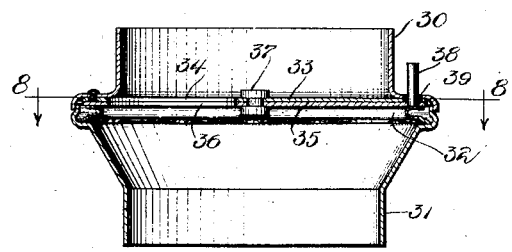
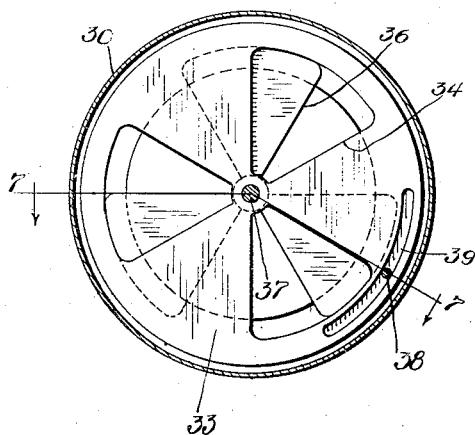
Witnesses:—
Verna Stuart
C. Paul Carker
Inventor,
William H. Roney
by Luther L. Miller
Attorney.

UNITED STATES PATENT OFFICE.

WILLIAM H. RONEY, OF GARY, INDIANA.

VALVE FOR GRANULAR MATERIALS.

1,116,741.  Specification of Letters Patent.  Patented Nov. 10, 1914.

Application filed September 24, 1913. Serial No. 791,454.

*To all whom it may concern:*

Be it known that I, WILLIAM H. RONEY, a citizen of the United States, residing at Gary, in the county of Lake and State of Indiana, have invented certain new and useful Improvements in Valves for Granular Materials, of which the following is a specification.

This invention relates to valves adapted for use in grain elevators and analogous places for regulating the flow of granular material. Most of the valves of this character heretofore used have been objectionable because of the fact that the movable valve member would frequently bind or choke up due to the grain working between the movable and the stationary parts. In this condition, the valve could be operated only with great difficulty, and furthermore it would not insure against leakage of the grain therethrough.

The primary object of my invention is to produce a valve which will never become choked, but on the contrary will always be freely operable, and which will at all times positively prevent leakage of the grain therethrough.

Another object is to provide a valve of this character which may be cheaply manufactured entirely from sheet metal.

Further objects and advantages relating to details of construction will be fully disclosed as the description proceeds.

In the accompanying drawings, Figure 1 is a vertical section on line 1 1 of Fig. 3 through one type of valve embodying the features of my invention. Fig. 2 is a horizontal section on line 2 2 of Fig. 1. Fig. 3 is a plan view of the valve on a reduced scale. Fig. 4 is a section on line 4 4 of Fig. 3. Fig. 5 is a plan view of a modified form of valve embodying the invention. Fig. 6 is a side elevation of the valve shown in Fig. 5. Fig. 7 is a vertical sectional view on line 7 7 of Fig. 8 showing another modification. Fig. 8 is a horizontal section on line 8 8 of Fig. 7.

Referring to Figs. 1 to 4, the valve comprises a suitable casing consisting of an upper section 10 and a lower section 11, said sections having their adjacent ends telescoping one within the other.

12 indicates a conduit which fits within the neck of the upper section 10 and delivers grain thereinto, and 13 indicates another conduit fitting about the neck of the lower section to receive grain from the valve. The lower section 11 has formed therein a ledge or shelf 14 upon which rests an annular valve seat 15. This valve seat is U-shape in cross section, as clearly indicated in Fig. 1, and the lower flange of the seat has a series of suitably formed legs 16 projecting downwardly and outwardly therefrom, said legs resting upon the ledge 14. If desired, each of these legs may be formed into an upwardly pointing ridge so that any grain coming in contact with the legs will freely slide therefrom. Below the ledge 14 the section 11 tapers downwardly to the neck within the conduit 13.

The upper flange of the valve seat 15 lies parallel to and closely beneath a horizontal ledge 17 formed in the upper casing section 10, and between the valve seat and said ledge 17 is a valve member 18 which may be a flat piece of sheet metal shaped to conform to the valve. The U-shape formation of the valve seat 15 and the provision of the legs 16 gives a resiliency to the valve seat which causes it to hold the valve member 18 tightly against the ledge 17. As indicated in Fig. 1, the interior of the valve seat 15 is preferably of greater diameter than the interior of the neck portion of the casing section 10, so that the grain flowing down through the section 10 when the valve is open will not be likely to lodge upon the valve seat 15.

An annular deflecting ring 19 has its upper portion fitting snugly within the upper end of the casing section 11, the lower portion of said ring being deflected inwardly in the manner of a hopper or a funnel.

At one side of the valve, the upper section 10 is provided with a horizontal extension 20 having its opposite edges downwardly and inwardly turned to provide runways 21 for guiding the valve member 18 in its movements. The extension 20 is cut away as at 22 to permit the operator to grasp the valve member 18.

Owing to the greater size of the valve seat 15 with relation to the neck of the upper casing section, grain is not apt to be deposited upon said valve seat. However, if any grain should accidentally fall upon the valve seat, the valve member as it is being closed will push such grain through the space between the upper flange of the valve seat and the ledge 17 and into the space at the outside of the valve seat. Thus the grain will not clog the movement of the valve member nor will it prevent the tight closing of the valve. The deflecting ring 19 will cause the grain to pass inwardly so that it will not lodge upon the shelf 14, and the shape of the legs 16 and the spaces therebetween permit such grain to pass on into the downwardly converging portion of the lower casing section. Thus it will be seen that even if a quantity of grain does collect in the path of the valve member, such grain will not interfere with the proper operation of said valve member, nor will the grain be damaged or wasted, but it will merely pass in another path through the valve and on to the lower part of the conduit.

In the embodiment illustrated in Figs. 5 and 6, the valve member 23 is made in two halves both pivoted to swing upon a pivot 24 at one side of the casing. The upper and lower casing sections are suitably enlarged to accommodate these valve members as they move outwardly to open the grain passage. Each of the valve members 23 has fixed thereto an arm 25, which arms are connected by links 26 to a longitudinally movable operating member 27 by which member the valve members 23 may be opened and closed. It will be understood that this valve is provided with a valve seat 28 similar to the valve seat 15 in Fig. 1, the seat 28 being held in place in any suitable way as by providing an annular depression or ledge in the lower casing section upon which ledge the valve seat rests in a manner indicated in Fig. 1. The valve members 23 move between the upper flange of the valve seat and the ledge of the casing corresponding to ledge 17.

In Figs. 7 and 8 is shown a valve having circular upper and lower casing sections 30, 31 and an annular valve seat 32. A disk 33 is suitably fixed at its edges to the upper casing section 30 and has a suitable number of openings 34 therein through which the grain may pass. The movable valve member 35 is in the form of a similar disk provided with corresponding openings 36, said valve member being mounted to rotate upon a pivot 37 fixed in the disk 33. The edges of the valve member bear upon the valve seat 32. The valve member may be rotated to bring the openings 34 and 36 into and out of register by means of a pin 38 fixed in said valve member and extending upwardly through arcuate slots 39 formed in the disk 33 and the ledge of the upper casing section 30. In this type of valve the deflecting ring corresponding to 19 in Fig. 1 is not necessary inasmuch as grain is not likely to find its way into the space at the outside of the valve seat 32.

It will be seen that I have produced a valve construction which is non-chokable, simple in construction, and cheap to manufacture. While I have herein shown the preferred forms of my invention, I would have it understood that I do not thereby intend to limit the invention to the constructions disclosed inasmuch as the type or form of the valve may be varied in many ways without departing from the essential characteristics of the invention in its broader aspects.

I claim as my invention:

1. A grain valve comprising a casing providing a guide portion, a yieldable valve seat positioned within said casing adjacent to said guide portion, and a slidable valve member extending between said valve seat and said guide portion, said valve seat being formed of sheet metal and having a flange contacting said valve member, the seat further having a plurality of spaced legs engaging the casing and supporting the valve seat in spaced relation to the casing.

2. In a grain valve, the combination of a sheet metal casing comprising an upper and a lower section suitably joined together, each of said sections having a horizontal ledge therein, a sheet metal valve seat bent into U form to provide an upper and a lower flange and having legs extending downwardly and outwardly from said lower flange and resting on said lower ledge, and a slidable valve member lying between the upper flange of said valve-seat and the upper ledge.

3. A valve for granular materials, comprising a casing providing an upper and a lower ledge extending substantially parallel with each other, a sheet metal valve seat U-shaped in cross section having legs resting upon said lower ledge, and a plate-like valve member extending between said valve seat and said upper ledge, the resiliency of said valve seat acting to press said valve member upwardly.

4. In a valve for granular materials, the combination of a casing providing a ledge, a valve seat positioned adjacent to said ledge, a space being provided between said valve seat and said casing through which space grain may pass, and a valve member extending between said valve seat and said ledge.

5. In a valve for granular materials, the combination of a casing providing a horizontal ledge, a yieldable valve seat positioned within said casing and beneath said ledge, a space being provided between said valve seat and said casing through which grain may pass, and a plate-like valve member guided between said valve seat and said ledge.

6. In a grain valve, in combination, a casing, a valve seat therein, and an edgewise movable plate-like valve member guided by said valve seat, a space being provided between said valve seat and said casing, said valve member being arranged to push grain out of its way and into said space to prevent clogging of the valve.

7. A grain valve comprising a casing having guide means therein and having a space at the outside of said guide means, and a movable valve member guided by said guide means and arranged to push grain therethrough and into said space to prevent clogging of the valve.

8. A grain valve comprising a body having a main passage therethrough and having a secondary passage at the outside of said main passage, said body further having guide means therein, and a movable valve member mounted in said guide means and arranged to push grain out of its way and into said secondary passage to prevent clogging of the valve.

9. A grain valve comprising a casing providing an upper and a lower ledge, a yieldable sheet metal valve seat having a plurality of legs resting on said lower ledge, a plate-like valve member extending between said valve seat and said upper ledge, a space being provided at the outer side of said valve seat within said casing, said valve member being arranged to push the grain in its path between said upper ledge and said valve seat and into said space, the grain descending through said space and between said legs into the lower portion of the valve casing.

10. In a valve for granular materials, the combination of a casing comprising an upper section and a lower section formed of sheet metal and having their adjacent ends telescoping with each other, each of said casing sections having a horizontal ledge, an annular sheet metal valve seat U-shape in cross section having a plurality of legs resting on the lower ledge, a plate-like valve member lying between the upper flange of said valve seat and said upper ledge, a space being provided at the outside of said valve seat within said casing to receive grain pushed outwardly by said valve member.

11. A grain valve comprising a casing having therein guide means including a yieldable valve seat, said casing having a space therein at the outer side of said valve seat, and an edgewise movable plate-like valve member extending along said valve seat, said valve member being arranged to push the grain in its path through said guide means and into said space to prevent clogging of the valve.

12. In a grain valve, the combination of a sheet metal casing comprising an upper and a lower section having their adjacent edges telescoping one within the other, each of said sections having a horizontal ledge therein, a sheet metal valve seat bent into U-form to provide an upper and a lower flange and having legs extending downwardly and outwardly from said lower flange and resting on said lower ledge, a space being provided at the outside of said valve seat within the casing, a slidable valve member lying between said valve seat and the upper ledge, and an extension on the casing having guides in which said valve member travels as it moves into and out of the casing.

In testimony whereof I affix my signature in the presence of two witnesses.

WILLIAM H. RONEY.

Witnesses:
WILLIAM C. GEAKE,
DELLA CRONKHITE.